US008919584B2

(12) United States Patent
Shaw et al.

(10) Patent No.: US 8,919,584 B2
(45) Date of Patent: Dec. 30, 2014

(54) ELECTRICAL EQUIPMENT MOUNTING FRAME

(75) Inventors: Steven A. Shaw, Greenville, NC (US); Thomas L. Stallings, Macclesfield, NC (US); Brent J. Ackermann, Reidsville, NC (US); Harshavardhan M. Karandikar, Longwood, FL (US)

(73) Assignee: ABB Technology AG, Zurich (CH)

( * ) Notice: Subject to any disclaimer, the term of this patent is extended or adjusted under 35 U.S.C. 154(b) by 155 days.

(21) Appl. No.: 13/442,535

(22) Filed: Apr. 9, 2012

(65) Prior Publication Data

US 2012/0255920 A1      Oct. 11, 2012

Related U.S. Application Data

(60) Provisional application No. 61/473,827, filed on Apr. 11, 2011.

(51) Int. Cl.
*H02B 5/02* (2006.01)
(52) U.S. Cl.
CPC ........................................ *H02B 5/02* (2013.01)
USPC ........................................ 211/107; 248/218.4
(58) Field of Classification Search
USPC ................. 211/107; 248/218.4, 219.1–219.4, 248/220.21, 637, 674, 678; 174/43, 45 R, 174/148, 149 R; 52/40, 697
See application file for complete search history.

(56) References Cited

U.S. PATENT DOCUMENTS

| | | | | |
|---|---|---|---|---|
| 1,239,142 A * | 9/1917 | Van Diest | ........................ | 52/697 |
| 1,246,304 A * | 11/1917 | Muller et al. | ................ | 174/45 R |
| 1,465,731 A * | 8/1923 | Hawkins | ..................... | 174/45 R |
| 1,620,949 A * | 3/1927 | Cassels | ........................... | 52/697 |
| 1,671,747 A * | 5/1928 | Seeger | .......................... | 403/389 |
| 2,056,366 A * | 10/1936 | Richards et al. | ................. | 52/697 |
| 2,970,800 A * | 2/1961 | Smalley | ..................... | 248/230.5 |
| 3,344,225 A * | 9/1967 | Jureit et al. | ................. | 174/45 R |
| 3,428,283 A * | 2/1969 | Dake | ............................. | 248/214 |
| 3,497,171 A | 2/1970 | Farmer et al. | | |
| 3,555,747 A * | 1/1971 | Taylor | ................................ | 52/40 |
| 3,653,622 A * | 4/1972 | Farmer | ......................... | 211/107 |
| 3,734,438 A | 5/1973 | Kautz | | |
| 3,856,250 A * | 12/1974 | Farmer | ......................... | 211/107 |
| 3,884,442 A * | 5/1975 | Breeden et al. | ................ | 211/107 |
| 4,025,824 A * | 5/1977 | Cheatham | ..................... | 361/601 |
| 4,127,739 A * | 11/1978 | Farmer | ........................ | 174/45 R |
| 4,194,080 A * | 3/1980 | Meisberger | ................. | 174/45 R |
| 4,296,904 A | 10/1981 | Farmer | | |
| 4,558,789 A | 12/1985 | Troutner | | |
| 4,654,540 A * | 3/1987 | Bridges | ........................ | 307/126 |

(Continued)

OTHER PUBLICATIONS

T. Starck, International Searching Authority (EPO), International Search Report and Written Opinion of the International Searching Authority for International Application No. PCT/US2012/032916, European Patent Office, mailed Aug. 17, 2012.

*Primary Examiner* — Joshua Rodden

(74) *Attorney, Agent, or Firm* — Melissa J. Szczepanik

(57) ABSTRACT

A mounting frame for removeably mounting one or more electrical devices has a base, a mounting bracket and a plurality of platforms for mounting the electrical devices thereon. The mounting bracket has openings for engaging with mounting bolts on a utility pole or other support structure. The mounting frame is balanced and has an eye bolt for elevating the frame to the desired level on the support structure during installation.

20 Claims, 2 Drawing Sheets

(56) References Cited

U.S. PATENT DOCUMENTS

| | | | |
|---|---|---|---|
| 4,682,747 A * | 7/1987 | King et al. | 248/68.1 |
| 4,684,031 A | 8/1987 | Bergman et al. | |
| 4,781,348 A | 11/1988 | Cutforth et al. | |
| 4,798,362 A * | 1/1989 | Troutner | 248/62 |
| 4,894,759 A * | 1/1990 | Siems | 362/249.01 |
| 4,896,856 A * | 1/1990 | Farmer et al. | 248/219.4 |
| 4,903,927 A | 2/1990 | Farmer et al. | |
| 5,193,774 A * | 3/1993 | Rogers | 248/219.4 |
| 5,505,316 A * | 4/1996 | Lee | 211/70.6 |
| 6,027,082 A * | 2/2000 | King et al. | 248/68.1 |
| 6,229,086 B1 * | 5/2001 | Blanding | 174/43 |
| 6,378,821 B1 * | 4/2002 | McKelvy et al. | 248/218.4 |
| 6,667,442 B1 * | 12/2003 | Hilligoss | 174/174 |
| 6,755,312 B2 | 6/2004 | Dziedzic | |
| 6,930,243 B1 * | 8/2005 | King et al. | 174/45 R |
| 7,530,539 B2 * | 5/2009 | Boschetti et al. | 248/219.2 |
| 8,207,728 B2 * | 6/2012 | Staszesky et al. | 324/127 |
| 2003/0042375 A1 * | 3/2003 | Sperry | 248/218.4 |

\* cited by examiner

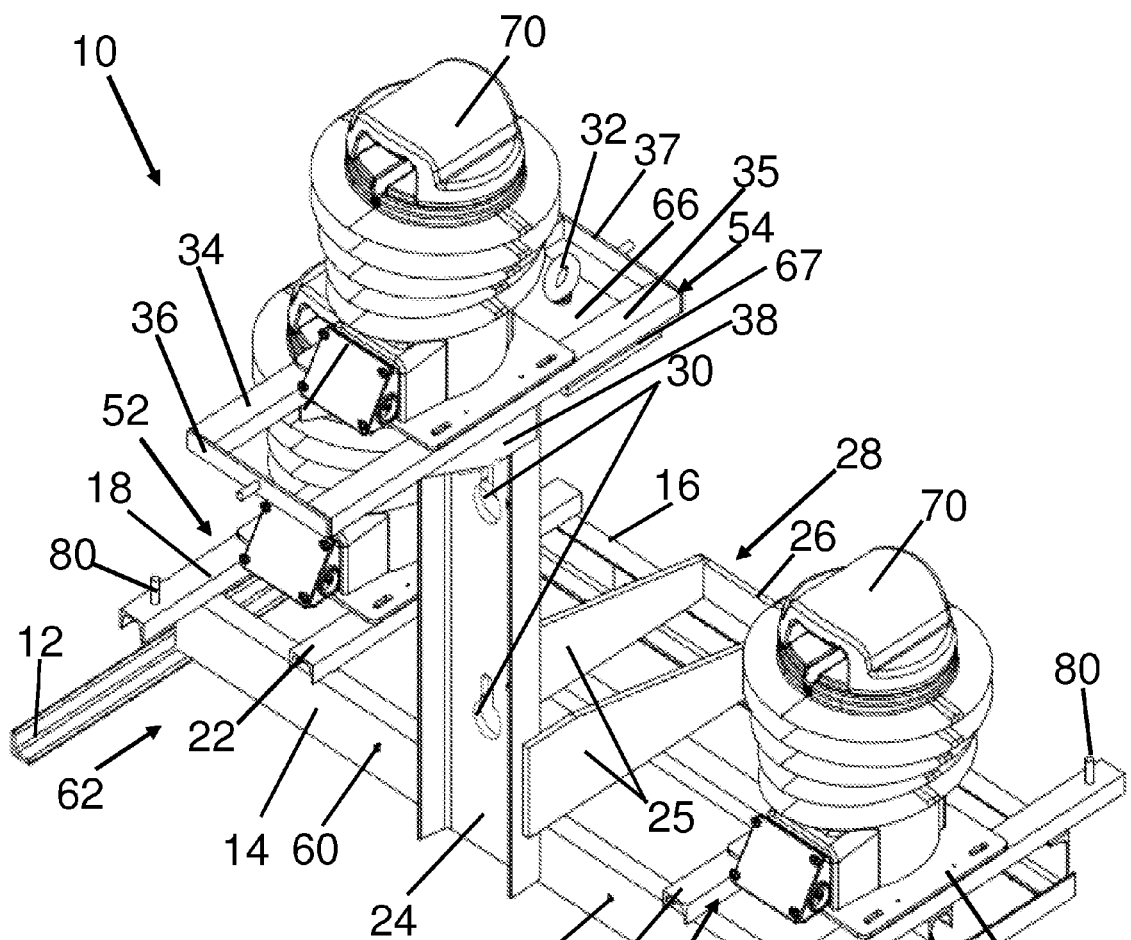
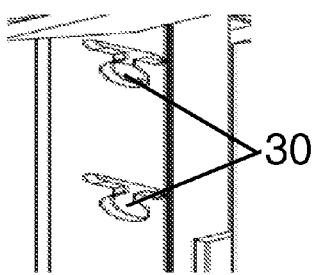
FIG. 2
FIG. 3

ELECTRICAL EQUIPMENT MOUNTING FRAME

CROSS-REFERENCE TO RELATED APPLICATION

This application claims the benefit of U.S. provisional patent application No. 61/473,827 filed on Apr. 11, 2011, which is hereby incorporated by reference in its entirety.

FIELD OF INVENTION

The present application is directed to a mounting frame, upon which one or more electrical devices are mounted.

BACKGROUND

Electrical equipment is often mounted to utility poles using various mounting brackets or frames. Mounting brackets may be used to mount individual electrical devices to utility poles or they may be connected to a support member that surrounds the utility pole. The use of mounting brackets necessitates installation of the electrical devices while the lineman is elevated near the top of the utility pole, rendering the installation process dangerous and time-consuming. Other cluster mounting frames may be used, but do not provide a balanced medium for installing a plurality of electric devices thereon. Additionally, when a plurality of electrical devices are mounted to a single frame it is difficult for the lineman to balance the assembly as it is being positioned on and attached to a utility pole. Accordingly, there is a need for a new type of mounting frame for electrical equipment that is balanced, safe to use and easy to install. The present invention is directed to such an improved mounting frame.

SUMMARY

A frame for mounting a plurality of electrical devices is adapted to engage with a mounting support structure such as a utility pole. The mounting frame comprises a base having a plurality of base members and a first and second platform, a longitudinal mounting bracket, and a third platform.

The base of the mounting frame is comprised of a first base member and a second base member, each having first and second ends, respectively. The first and second base members are connected together by a first platform and a second platform. The first and second platforms are adapted for removeably mounting an electrical device thereon. The first and second platforms are located about equidistant from the longitudinal mounting bracket.

The longitudinal mounting bracket of the mounting frame has a first end portion and a second end portion. The first end portion of the longitudinal mounting bracket is attached near the center of the first base member. The longitudinal mounting bracket extends vertically from its attachment point with the first base member. The longitudinal mounting bracket has one or more mounting openings that are adapted to engage with a mounting bolt or mounting assembly.

The third platform of the mounting frame is raised at a level above the first and second platforms. The third platform is attached to the second end portion of the longitudinal mounting bracket. The third platform is adapted for removeably mounting an electrical device.

An apparatus having a plurality of electrical devices mounted thereon is adapted to engage with a mounting support structure such as a utility pole. The apparatus comprises a base having a plurality of base members and a first and second platform, a longitudinal mounting bracket, and a third platform. The first, second, and third platforms have electrical devices removeably mounted thereon.

The base of the apparatus is comprised of a first base member and a second base member, each having first and second ends, respectively. The first and second base members are connected together by a first platform and a second platform. The first and second platforms are adapted for removeably mounting an electrical device thereon. The first and second platforms are located about equidistant from the longitudinal mounting bracket.

The longitudinal mounting bracket of the apparatus has a first end portion and a second end portion. The first end portion of the longitudinal mounting bracket is attached near the center of the first base member. The longitudinal mounting bracket extends vertically from its attachment point with the first base member. The longitudinal mounting bracket has one or more mounting openings that are adapted to engage with a mounting bolt or mounting assembly.

The third platform of the apparatus is raised at a level above the first and second platforms. The third platform is attached to the second end portion of the longitudinal mounting bracket. The third platform is adapted for removeably mounting an electrical device.

BRIEF DESCRIPTION OF THE DRAWINGS

In the accompanying drawings, structural embodiments are illustrated that, together with the detailed description provided below, describe exemplary embodiments of a mounting frame for electrical equipment. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

FIG. 2 is an isometric view of the electrical equipment mounting frame having exemplary electrical equipment mounted thereon.

FIG. 3 is shows the mounting openings of the mounting frame in more detail.

DETAILED DESCRIPTION

Figure 1:
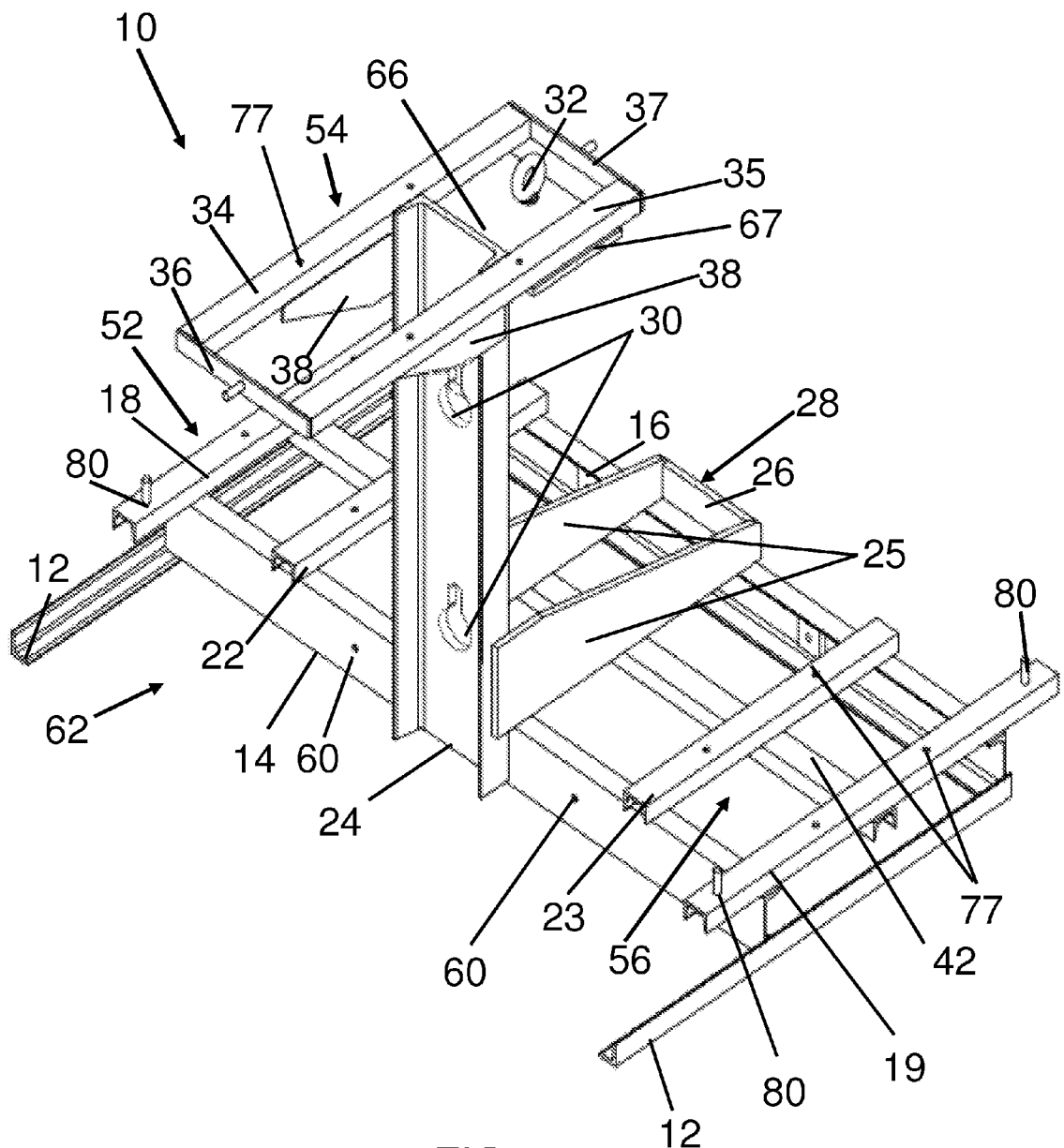
FIG. 1 is an isometric view of the electrical equipment mounting frame.

Referring to FIGS. 1 and 2, a mounting frame 10 for mounting electrical equipment 70 to a support structure, generally a utility pole, is shown. The electrical equipment 70 that may be mounted using the frame of the present invention includes but is not limited to, electrical devices 70 such as sensors and instrument transformers. The mounting frame 10 is formed of a weather-resistant material such as aluminum, galvanized steel, or another metal having weather-resistant characteristics and capable of supporting the weight of a plurality of electrical devices 70. The mounting frame 10 of the present invention is utilized in power distribution systems having power lines arranged in a triangular configuration, with one power line centered between and elevated above two power lines running parallel in the same plane. The mounting frame 10 is weight-balanced so that a plurality of electrical devices 70 may be installed while the frame 10 is located on the ground or another stable surface. The weight-balancing of the frame 10 allows for ease of elevation of the frame 10 to the top of a support structure after a plurality of electrical devices 70 are mounted thereon.

The mounting frame 10 has a base 62 comprised of base members 14, 16, 42, and cross-connecting members 18, 19, 22, 23 that form first, second, and third platforms 52, 56, 54 for mounting electrical devices 70, and a longitudinal mounting bracket 24 for attaching the frame 10 to a utility pole. The connections between the respective members of the frame are welded connections. The base members 14, 16, 42 are comprised of a first base member 14, a second base member 16, and a reinforcement base member 42. The base 62 of the mounting frame 10 may be generally rectangular in shape, having two or more parallel, base members 14, 16, 42, and two or more cross-connecting members 18, 19, 22, 23. The first base member 14, second base member 16, reinforcement base member 42, longitudinal mounting bracket 24, and cross-connecting members 18, 19, 22, 23 may be formed of elongated C-channeled members having a flat portion attached to a first and a second flange wherein the first flange is located proximate to a first edge of the flat portion and the second flange is located proximate to a second edge of the flat portion. The first and second flanges extend outward from the first and second edges of the flat portion in each of the first and second base members 14, 16, the reinforcement base member 42, each of the cross-connecting members 18, 19, 22, 23, and the longitudinal mounting bracket 24.

The first, second, and third platforms 52, 56, 54 are of a generally rectangular shape and are provided for removeably bolting the base 71 of an associated one of a plurality of electrical devices 70 to the mounting frame 10 using one or more through-holes 77. The first and the second mounting platforms 52, 56 are for mounting an associated one of the electrical devices 70 to the base 62 of the frame 10 and are formed from the first base 14, second base 16, and cross-connecting members 18, 19, 22, 23. Additional support for each of the electrical devices mounted upon an associated one of the first and second mounting platforms 52, 56 may be provided by a reinforcement base member 42. The first and second mounting platforms 52, 56 are spaced equidistant from a longitudinal mounting bracket 24.

The electrical device 70 mounted to the first platform 52 rests on two or more cross-connecting members 18, 22. The cross-connecting members 18, 22 are further supported by a first end portion of each of the first, second and reinforcement base members 14, 16, 42. The electrical device 70 mounted to the second platform 56 rests on two or more cross-connecting members 19, 23. The cross-connecting members 19, 23 are further supported by a second end portion of each of the first, second and reinforcement base members 14, 16, 42. Two of the cross-connecting members 18, 19 may extend beyond the flat portions of the first base member 14 and second base member 16, respectively. The remaining cross-connecting members 22, 23 may only slightly extend beyond the flat portions of the first base member 14 and second base member 16, respectively.

The longitudinal mounting bracket 24 extends outward from the base 62 of the frame 10 and has a first end portion and a second end portion. The first end of the longitudinal mounting bracket 24 is connected proximate to the center of the first base member 14. The second end of the longitudinal mounting bracket 24 is located between two parallel, raised platform members 34, 35. The first and second flanges of the second end of the longitudinal mounting bracket 24 are connected to an inner surface of an associated one of the raised platform members 34, 35. The longitudinal mounting bracket 24 may be supported by a reinforcement member 28 that connects the first end of the longitudinal mounting bracket 24 to a top portion of each of the first, second and reinforcement base members 14, 16, 42. The reinforcement member 28 is formed of two flat, generally trapezoid-shaped pieces 25 each having a first end and a second end, respectively, and a connecting member 26. The connecting member connects the second ends of the trapezoid-shaped members 25 together. The first ends of each of the trapezoid-shaped members 25 are connected to the longitudinal mounting bracket 24.

The third platform 54 is generally rectangular in shape and formed from the first and second raised platform members 34, 35, each of which have a first end and a second end, respectively, and a first and a second connecting platform member 36, 37. The first and the second raised platform members 34, 35 are c-channeled members of the same construction as the aforementioned c-channeled members 14, 16, 42, 24, 18, 19, 22, 23. Each of the connecting platform members 36, 37 are formed of a flat plate. The first connecting platform member 36 connects the first ends of each of the first and second raised platform members 34, 35. The second connecting platform member 37 connects the second ends of each of the first and second raised platform members 34, 35. The third platform 54 is elevated above the first and second platforms 52, 56 and located near the center of gravity of the frame 10. A first end of the third platform 54 extends substantially beyond the first base member 14. The third platform may be further supported by one or more support members 38. The one or more support members 38 connect an associated one of the raised platform members 34, 35 to the first and second flanges of the longitudinal mounting bracket 24.

The longitudinal mounting bracket 24 is typically a flat piece having the first and second flanges extending outwardly from the flat piece. However, in one embodiment, the longitudinal mounting bracket 24 may be concave in shape and is provided without the first and second flanges in order to effectively mate with the shape of the support structure upon which it is mounted.

The longitudinal mounting bracket 24 has one or more inverted keyhole-shaped openings 30 formed proximate to the center of the flat portion of the longitudinal mounting bracket 24. The inverted key-hole shaped openings 30 are adapted to engage with mounting bolts on the support structure. The inverted key-hole shape of the mounting opening 30 depicted in FIGS. 1 and 2 allows the opening 30 to receive the head of the mounting bolt at the larger portion of the opening 30 and receive the body of the mounting bolt at the smaller portion of the opening 30. The key-hole shaped mounting opening 30 may also be embodied as a generally arcuate opening that extends into a horizontal slot having rounded edges as shown in FIG. 3. A person of ordinary skill in the art will recognize that other mounting openings are possible. In the case of the mounting opening of FIG. 3, the horizontal slot of the mounting opening allows the frame 10 to be rotated before being fastened down. The frame 10 may be rotated slightly to the left or right to a position where the power lines are generally perpendicular to the electrical devices 70 attached to the mounting frame 10.

The mounting frame 10 may be provided with one or more legs 12 attached to an associated one of the opposing sides of the base 62. The one or more legs 12 may provide additional stability during the installation of the electrical devices 70 to the frame 10. Installation of the electrical devices 70 to the frame may be accomplished while the frame 10 is located on the ground or on any flat surface.

An eye bolt 32 is located at the center of gravity of the mounting frame 10. The eye bolt 32 is attached to a recessed area 66 located near a second end of the third platform 54. The recessed area 66 is formed from a generally square-shaped planar member 67. The planar member 67 has first opposing sides that may not engage other members, effectively forming small gaps between the two first opposing sides and the second end of the longitudinal mounting bracket 24 and the second connecting platform member 37. Second opposing sides of the planar member 67 each connect to an associated one of the first and second connecting platform members 36, 37. The eye bolt 32 serves as a balanced lifting point and may be connected to a lifting mechanism, such as the cable hook of a crane, for raising the mounting frame to the desired position on the support structure. The linemen may then attach the mounting frame to the support structure by engaging the mounting openings 30 with the mounting bolts or similar mounting mechanism of the support structure. The eye bolt 32 may also be threaded with a cable or similar supporting mechanism to stabilize the mounting frame while the electrical devices are being installed to the frame or to elevate the frame to a desired position.

Each of the first, second, and third platforms 52, 56, 54 has one or more posts 80 disposed proximate to a first and a second end portion of each of the platforms 52, 54, 56 for mounting electrical equipment such as surge arresters to the frame 10. The surge arresters protect the electrical devices 70 mounted on the frame 10 from lightning flashover.

The frame 10 is provided with through-holes 60 for engaging with brackets that can be used to secure the frame 10 to a pallet or other packaging material during the shipping process. The mounting frame 10 may be provided in an embodiment that utilizes less material, making the mounting frame 10 more cost-effective while retaining the same overall design.

While the present application illustrates various embodiments of a mounting frame for electrical equipment, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A mounting frame for mounting electrical devices thereon, said mounting frame for engaging with a mounting support structure, said mounting frame comprising:
    a base comprised of a first base member and a second base member, said first base member and said second base member each having first and second ends, said first base member being connected to said second base member by a first platform and a second platform, each of said first and second platforms for removeably mounting one of the electrical devices thereon, said first and second platforms being located about equidistant from a longitudinal mounting bracket;
    said longitudinal mounting bracket having a first end and a second end, said first end of said longitudinal mounting bracket being attached proximate to a center of said first base member, said longitudinal mounting bracket extending vertically from said first base member, said longitudinal mounting bracket having one or more mounting openings for engaging with a mounting bolt or assembly;
    a reinforcement member having a first end portion and a second end portion, said first end portion of said reinforcement member being connected to a first end portion of said longitudinal mounting bracket and said second end portion of said reinforcement member being connected to said second base member;
    and a third platform for removeably mounting one of the electrical devices, said third platform being attached to said second end of said longitudinal mounting bracket and being disposed at a level above said first and second platforms.

2. The mounting frame of claim 1 wherein said first base member, said second base member, and said longitudinal mounting bracket are each further comprised of a flat portion having a first side edge and a second side edge, said first side edge attached to a flange extending outwardly from said first side edge and said second side edge attached to a flange extending outwardly from said second side edge.

3. The mounting frame of claim 1 wherein said third platform is further comprised of a first raised platform member, a second raised platform member, a first connecting platform member, and a second connecting platform member arranged in a generally rectangular configuration, said first raised platform member having a first end and a second end, said second raised platform member having a first end and a second end, said first end of said first raised platform member and said first end of said second raised platform member connected together by said first connecting platform member and said second end of said first raised platform member and said second end of said second raised platform member connected together by said second connecting platform member.

4. The mounting frame of claim 3 wherein said third platform is supported by one or more support members, said one or more support members connecting the second end of said longitudinal mounting bracket to each of said first and second raised platform members, respectively.

5. The mounting frame of claim 3 wherein said third platform is further comprised of a planar member having opposing first and second sides, said first side connected to a bottom portion of said first raised platform member and said second side connected to a bottom portion of said second raised platform member, said planar member forming a recess when attached to said first raised platform member and said second raised platform member.

6. The mounting frame of claim 5 wherein said third platform is further comprised of an eye bolt disposed proximate to the center of gravity of said mounting frame when said eye bolt is disposed proximate to the center of said planar member.

7. The mounting frame of claim 1 further comprising at least two legs, said at least two legs connected to an associated one of a first and second opposing side of said base, said at least two legs extending outwardly beyond said first base member.

8. The mounting frame of claim 1 further comprising a reinforcement base member that connects said first and second platforms, said reinforcement base member located between said first and second base members and co-planar with said first and second base members.

9. The mounting frame of claim 1 wherein said one or more mounting openings are further comprised of a generally arcuate opening extending into a horizontal slot.

10. The mounting frame of claim 1 wherein each of said first platform, said second platform, and said third platform further comprises one or more posts for mounting one of the electrical devices thereon.

11. A apparatus having electrical devices mounted thereon, said apparatus for engaging with a mounting support structure, said apparatus comprising:

a base comprised of a first base member and a second base member, said first base member and said second base member each having first and second ends, said first base member being connected to said second base member by a first platform and a second platform, each of said first and second platforms having one of said electrical devices mounted thereon, said first and second platforms being located about equidistant from a longitudinal mounting bracket;

said longitudinal mounting bracket having a first end and a second end, said first end of said longitudinal mounting bracket being attached proximate to a center of said first base member, said longitudinal mounting bracket extending vertically from said first base member, said longitudinal mounting bracket having one or more mounting openings for engaging with a mounting bolt or assembly;

a reinforcement member having a first end portion and a second end portion, said first end portion of said reinforcement member being connected to a first end portion of said longitudinal mounting bracket and said second end portion of said reinforcement member being connected to said second base member;

and a third platform having one of the electrical devices removeably mounted thereon, said third platform being attached to said second end of said longitudinal mounting bracket and being disposed at a level above said first and second platforms.

12. The apparatus of claim 11 wherein each of said first base member, said second base member, one or more first platform members of said first platform, and one or more second platform members of said second platform are c-channel members.

13. The apparatus of claim 11 wherein said third platform is further comprised of a first raised platform member, a second raised platform member, a first connecting platform member, and a second connecting platform member arranged in a generally rectangular configuration, said first raised platform member having a first end and a second end, said second raised platform member having a first end and a second end, said first end of said first raised platform member and said first end of said second raised platform member connected together by said first connecting platform member and said second end of said first raised platform member and said second end of said second raised platform member connected together by said second connecting platform member.

14. The apparatus of claim 13 wherein said third platform is supported by one or more support members, said one or more support members connecting the second end of said longitudinal mounting bracket to each of said first and second raised platform members, respectively.

15. The apparatus of claim 13 wherein said third platform is further comprised of a planar member having opposing first and second sides, said first side connected to a bottom portion of said first raised platform member and said second side connected to a bottom portion of said second raised platform member, said planar member forming a recess when attached to said first raised platform member and said second raised platform member.

16. The apparatus of claim 15 wherein said third platform is further comprised of an eye bolt disposed proximate to the center of gravity of said apparatus when said eye bolt is disposed proximate to the center of said planar member.

17. The apparatus of claim 11 further comprising at least two legs, said at least two legs connected to an associated one of a first and second opposing side of said base, said at least two legs extending outwardly beyond said first base member.

18. The apparatus of claim 11 further comprising a reinforcement base member that connects said first and second platforms, said reinforcement base member located between said first and second base members and co-planar with said first and second base members.

19. The apparatus of claim 11 wherein said one or more mounting openings are further comprised of a generally arcuate opening extending into a horizontal slot.

20. The apparatus of claim 11 wherein each of said first platform, said second platform, and said third platform further comprises one or more posts for mounting one of the electrical devices thereon.

* * * * *